(12) United States Patent
Feller

(10) Patent No.: US 7,480,577 B1
(45) Date of Patent: Jan. 20, 2009

(54) MULTIPLE SENSOR FLOW METER

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 11/677,149

(22) Filed: Feb. 21, 2007

(51) Int. Cl.
*G01F 1/00* (2006.01)
*G01F 7/00* (2006.01)
*G01F 1/50* (2006.01)
*G01F 25/00* (2006.01)
*G06F 19/00* (2006.01)

(52) U.S. Cl. .................... 702/45; 702/48; 702/100
(58) Field of Classification Search ............... 702/45, 702/100, 48
See application file for complete search history.

(56) References Cited

U.S. PATENT DOCUMENTS

| 4,399,696 | A |   | 8/1983  | Feller |         |
|-----------|---|---|---------|--------|---------|
| 4,542,650 | A | * | 9/1985  | Renken et al. | 73/196 |
| 4,790,195 | A | * | 12/1988 | Feller | 73/861.77 |
| 5,436,826 | A | * | 7/1995  | O'Flarity | 700/79 |
| 5,708,213 | A | * | 1/1998  | Batey | 73/861.12 |
| 6,178,827 | B1 | * | 1/2001 | Feller | 73/861.27 |
| 6,205,409 | B1 |   | 3/2001 | Zvonar |  |
| 6,739,203 | B1 |   | 5/2004 | Feldman et al. |  |
| 6,807,494 | B2 | * | 10/2004 | Schutzbach et al. | 702/45 |
| 6,907,383 | B2 |   | 6/2005 | Eryurek |  |
| 7,004,036 | B2 |   | 2/2006 | Gimson |  |
| 2002/0152030 | A1 | * | 10/2002 | Schultz et al. | 702/6 |
| 2004/0074279 | A1 | * | 4/2004 | Forrest | 73/1.06 |

* cited by examiner

*Primary Examiner*—Hal D Wachsman
*Assistant Examiner*—Janet L Suglo
(74) *Attorney, Agent, or Firm*—David Kiewit

(57) ABSTRACT

Combining a plurality of local flow measurements made at more than one location to generate a composite flow value can improve the accuracy of the overall measurement. The reliability and long term accuracy of a multi-sensor flow measurement are improved by a two-step process. During an initial learning period, when all of the local sensors are providing accurate local measurements, a calibration table is built up that associates each calculated composite flow value with the set of local flow signal values from which it was calculated. In a subsequent operational period each time the composite flow rate is to be determined the flow meter apparatus first checks to see if all the local sensors are working properly and, if one of them is not working properly, its output is replaced with the corresponding value from the calibration table.

12 Claims, 3 Drawing Sheets

MULTIPLE SENSOR FLOW METER

BACKGROUND OF THE INVENTION

The present invention relates to apparatus and methods for measuring an overall flow rate of a fluid with particular emphasis on methods made by combining a plurality of local measurements.

Combining a plurality of local flow measurements made at more than one location in the cross section of a flow profile to generate a composite flow value representative of the overall flow rate can improve the accuracy of the overall measurement. In addition, using multiple flow rate sensors provides a degree of redundancy so that if one local sensor fails, the remaining flow rate sensor or sensors may still be able to provide a usable flow rate indication until repairs are made.

Generating a composite flow output from a plurality of local sensors can be important when measuring a highly inhomogeneous flow. Such a situation can arise, for example, where the flow measurement must be made very close to a piping structure, such as a ninety degree elbow, that can induce swirl or distort the flow profile from what would be expected in a long, straight run of pipe. In cases such as this, dropping the output from a failed sensor and using the outputs from the remaining ones can lead to an unacceptably high error in the measurement. One thing that is needed, but not provided by the prior art, is apparatus and method for generating an acceptably accurate composite flow measurement from a plurality of local sensors when one or more of the sensors is defective.

BRIEF SUMMARY OF THE INVENTION

The invention provides a multi-step method of determining an overall rate of flow of a fluid from a plurality of local flow signals received from a corresponding plurality of local flow sensors. During an initial learning period, in which it is assumed that all of the local sensors are providing accurate local measurements, an overall fluid flow rate is determined by combining the outputs from all of the sensors in accordance with a flow-calculating algorithm, which may be a simple average, a weighted average, or any other suitable combination of local outputs that yields an accurate overall flow rate when all the local sensors are functioning properly. During this learning period a calibration table is built up that associates each calculated composite flow value with the set of local flow signal values from which it was calculated.

In an operational period subsequent to the learning period, each time the composite flow rate is to be determined the flow meter apparatus first checks to see if all the local sensors are working properly and, if one of them is not working properly, its output is replaced with the corresponding value from the calibration table (or with a value interpolated from two or more calibration records in the calibration table). In one preferred method, this is done by first combining current flow output signals from all of the flow sensors according to the selected flow-calculating algorithm to yield a nominal composite flow value and then comparing each of the current local flow signals with the respective associated stored local flow signal from the calibration record corresponding to the current nominal composite flow value. If any one of the current local flow signals differs from the respective associated stored signal by more than an allowable amount when compared to the other local flow signals, the current local flow signal is replaced with the associated stored output signal value. A corrected composite flow value representative of the overall rate of flow of the fluid is then calculated from the set of local flow signals, where that set now contains at least one replacement value. On the other hand, if all of the local flow signals are close to the values expected for the nominal overall flow signal, the nominal composite flow value is considered to be representative of the overall rate of flow of the fluid.

Because the sensor backup data from a defective sensor includes deviations from the overall composite value, as may be caused by swirl or variations in the flow profile over a range of flow rates, the inclusion of stored data in a recalculated meter output will enable the meter to retain a degree of accuracy that would not be possible if one were to merely omit the contribution of a defective sensor from the overall composite flow output. It may be noted that if flow conditions change so as to alter the swirl or flow profile from the time that the learning mode was completed, and all local sensors are currently providing satisfactory date, the learning mode can be repeated. On the other hand, if flow deviations are so highly variable that a stored value does not represent a current one, the present invention is of limited usefulness.

If a dual element turbine meter is employed, a significant slowdown or stoppage of only one of the rotors can usually be relied upon to indicate that the other rotor is operating properly. The backup data from the defective rotor, corresponding to the flow rate being sensed by the operational rotors can be combined with the data from the operational rotor to provide the meter output. Because the backup data would have accounted for flow sensing deviations from the nominal, as may be caused by swirl for example, the meter precision, even with a defective rotor, will approach that of the fully functional meter.

As an additional example, consider a quad-sensor ultrasonic flow meter. If one of the sensors becomes defective, as indicated by its inability to provide flow rate data approximating its backup data, its backup data can then contribute to the meter output along with that of the other three sensors which are considered to be operating properly. Should one of the remaining operational sensors similarly become defective, its backup data is also substituted for its current data. Should one of the two remaining sensors catastrophically fail—i.e., so that it is certain which one has failed, its backup data is also used to substitute for its current data. The meter precision would then be dependent on the data contributions of the sole remaining operational sensor and the backup data from the three defective sensors and will be degraded only a relatively small amount in a typical application. The ability of the meter to still provide the needed metering precision after one or more of its sensors have become defective is a major advantage and allows a meter operator to service the flow meter when convenient, rather than immediately.

The present invention is particularly effective in an application where meter installation is less than ideal, meter servicing is difficult, and a moderate to high degree of measurement precision is required. An example of such an application is the flow rate measurement in large hydronic heating and cooling loops in large buildings. These loops often have limited straight runs in convenient locations and are difficult to drain so that a flow meter can be replaced or serviced.

Although it is believed that the foregoing description may be of use to one who is skilled in the art and wishes to learn how to practice the invention, it will be recognized that the foregoing recital is not intended to list all its embodiments, features and advantages. Those skilled in the art will appreciate that they may readily use both the underlying ideas and the specific embodiments disclosed in the Detailed Description as a basis for designing arrangements to achieve the same purpose of the present invention and that such equivalent constructions are within the spirit and scope of the invention in its broadest form. Moreover, it may be noted that different embodiments of the invention may produce various combinations of the recited features and advantages of the invention and that less than all of the recited features and advantages may be provided by some embodiments.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
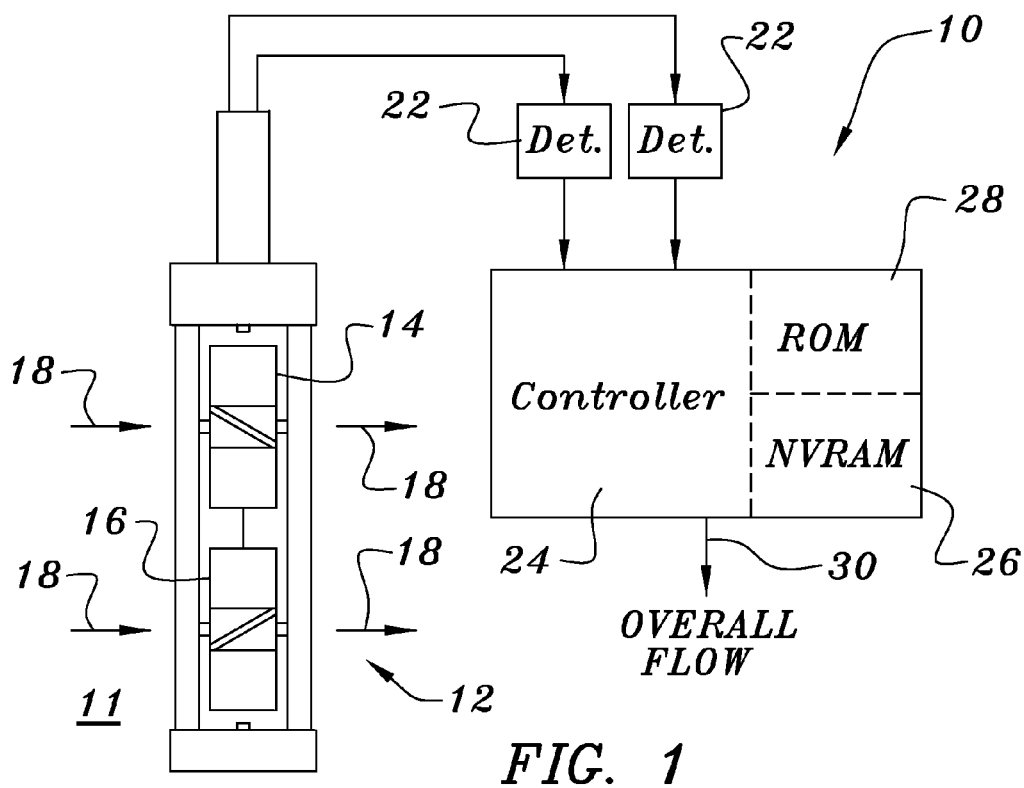
FIG. 1 is a schematic depiction of a flow meter of the invention having two local flow rate inputs from dual turbine flow sensing probes.

Turning now to FIG. 1, one finds a schematic block depiction of an embodiment of the flow meter of the invention 10 that employs an assembly 12 comprising two contra-rotating turbine elements 14 and 16. This arrangement allows for continued operation even if one of the two turbine elements fails or becomes temporarily clogged—e.g., by a leaf entrained in a water pipe. The arrows 18 show the direction of flow of the fluid 11 through the sensor assembly 12. In normal operation the rotational rates of the two turbines are individually detected by rotation detectors 22 and the two rotational rate signals are processed by a microcontroller 24, which provides a composite flow rate output signal 30.

In operating the apparatus of FIG. 1, the turbine elements rotate in opposite directions, as depicted by the opposite blade pitches, so that an average of their local output signals compensates for swirl in the flow stream and is usually provided as the composite flow rate output. A sensor of this sort is described in greater detail in my U.S. Pat. No. 4,399,696, the disclosure of which is herein incorporated by reference.

In many situations one of the turbine elements may exhibit a reduction in response, but it is highly unlikely that both turbine elements would exhibit a similar reduction in response at the same time. The inventive method of replacing a current measured value with a corresponding value from a calibration table has particular applicability to installations where turbine element bearings are prone to jamming or sticking. For example, if the fluid flow is shut down for a period of time, e.g. seasonally, when it is reestablished one of the two turbine elements may not come up to full speed right away. In this case the 'sticky' turbine's signal is replaced by data from its stored calibration curve. The data processor 24 can then continue to compare the local signal from the failed turbine against that of the functional element and, should full speed operation be realized, the flow meter can again use the signal from the formerly slow element.

Figure 2A:
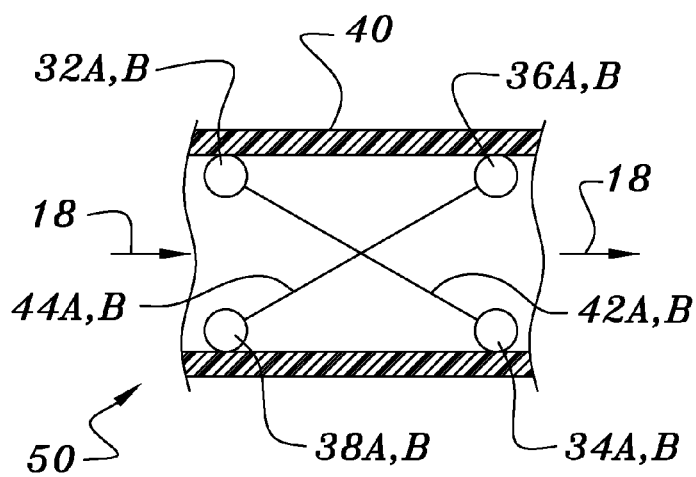
FIG. 2A is a schematic cross sectional depiction of a transducer configuration for a four-beam transit time ultrasonic flow meter.
Figure 2B:
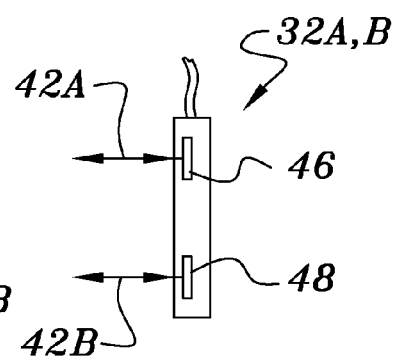
FIG. 2B is a schematic depiction showing a layout of transducers used in FIG. 2A.

Another flow measurement arrangement in which the invention is useful involves an ultrasonic flow meter having a plurality of acoustic beams sampling various portions of a fluid flow. In FIG. 2A one finds a schematic view of a cross section of the wetted portion 50 of a transit time flow meter. As a matter of convenience in explaining the operation of such a meter, FIG. 2A may be considered to be taken in a horizontal plane, and the corresponding elevational detail view of FIG. 2B can be considered to be in a vertical plane. In this example, a pipe 40 containing fluid 11 flowing in the direction indicated by arrows 18 contains four transducer assemblies 32A,B, 34A,B, 36A,B and 38A,B, arranged so that their acoustic beams 42A,B and 44A,B sample the fluid flow at various positions in the pipe, These beams may cross each other in the shape of an X. Each of the transducer assemblies contains two transducer elements, as exemplified by transducer 32A,B shown from the side in FIG. 2B, which incorporates element 46 corresponding to acoustic beam 42A and element 48 corresponding to acoustic beam 42B. A total of four separate acoustic paths are defined. This enables the same number of local flow rate measurements to be made at different locations, thereby better accounting for variations in the flow profile over a range of flow rates when compared to a single path measurement. A more detailed explanation of this exemplar configuration is supplied in my patent U.S. Pat. No. 6,739,203, the disclosure of which is herein incorporated by reference.

Although the two examples above describe measurement arrangements in which the invention is useful, the reader should realize that the invention is not limited to any particular type or number of local sensors. Any selected number of local flow sensors greater than one can be used in practicing the invention. Any sort of local flow sensing technique can be used, including, but not limited to, acoustic, moving target, turbine, thermal dilution, differential pressure, etc.

Figure 3:
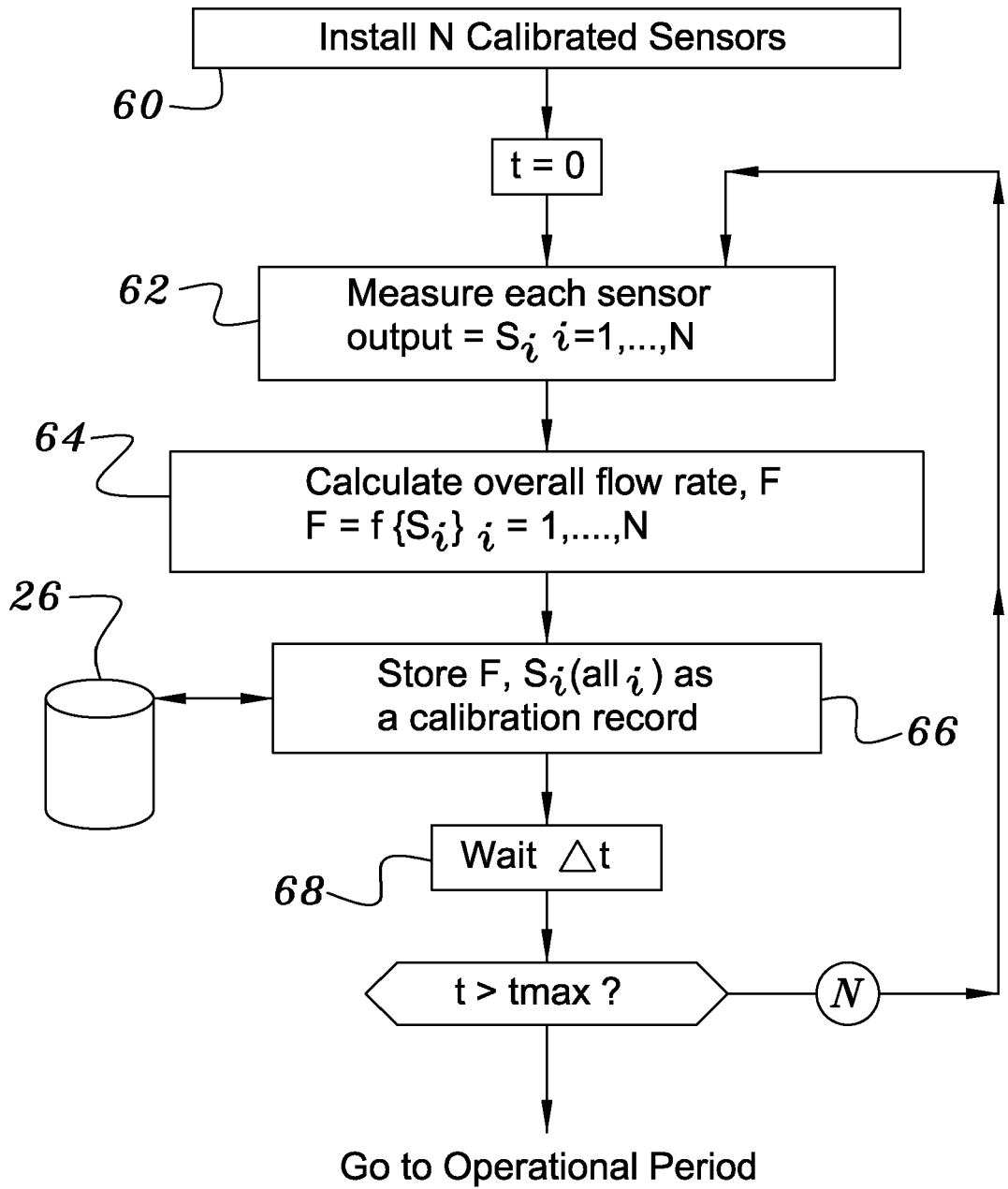
FIG. 3 is a flow diagram showing operation, in a learning period, of a flow meter of the invention.

Turning now to FIG. 3, one finds a flow chart depicting a number of steps in a preferred process of installing flow measurement apparatus and using that apparatus during a learning period to set up calibration tables that are conveniently stored in a non-volatile computer memory 26. The process is preferably controlled by a microcomputer 24 operating under control of a program stored in a read-only memory 28 or other computer readable medium. The exemplar process begins in Step 60 with the installation of a selected number, N, of local flow sensors, each of which is previously calibrated to provide a flow output signal representative of whatever local flow rate it experiences during the learning period. At each time when a flow rate is to be determined during the learning period the outputs from all the local flow sensors are collected (Step 62) and an overall composite flow rate is calculated (Step 64) from the set of local flow sensor outputs. In many cases the best estimate of the composite flow rate is an average of the local flow rates. In some other cases it is a weighted average. However, the reader should appreciate that many different functional relationships may exist between the local flow measurements and the calculated composite flow value, as generally depicted in FIG. 3.

During the learning period the flow is controlled or allowed to vary over a flow range of interest. Although the details of how flow is initiated or varied are not important to the present discussion, the reader will appreciate that the duration of the learning period is preferably long enough that all flow rates in a range of interest will be experienced by the measurement equipment. During this period a plurality of calibration records are stored in the non-volatile memory (Step 66). Each such record comprises the calculated composite flow value and all of the individual local flow values that were used to calculate that composite value.

It is possible that a learning period could be set up to encompass a single excursion of flow rate from a minimum to a maximum allowable value—e.g., as might happen if one slowly opened a valve. In this case, the matter of storing a set of calibration records could be reduced to a simple matter of making a measurement at regular intervals during the single excursion learning period. In other cases, however, the apparatus may be installed and put into regular operation for a learning period long enough to provide measurements covering the desired range but short enough that all the local flow sensors can be trusted to maintain their initial calibrations. In such cases one should expect that many measurements will be made at some targeted flow value, with fewer measurements made at the highest and lowest values. The reader should appreciate that in cases like this there are many known approaches to building a calibration table comprising a plurality of calibration records. For example, one could choose to use the most recent set of values and to discard earlier values. Alternately, when a composite flow value is found that matches a previously measured one, a new calibration record could be defined by averaging each current local sensor output with the corresponding local sensor outputs from earlier measurements. Those skilled in the measurement arts will thus appreciate that there are many approaches to dealing with duplicative readings and that all such approaches should be considered as being within the spirit and scope of the present invention.

Moreover, although the depiction of FIG. 3 shows a process in which measurements are made at regular intervals of Δt (e.g. see Step 68), it will be appreciated that many other approaches could be considered to building up the desired calibration table during the learning period.

Figure 4:
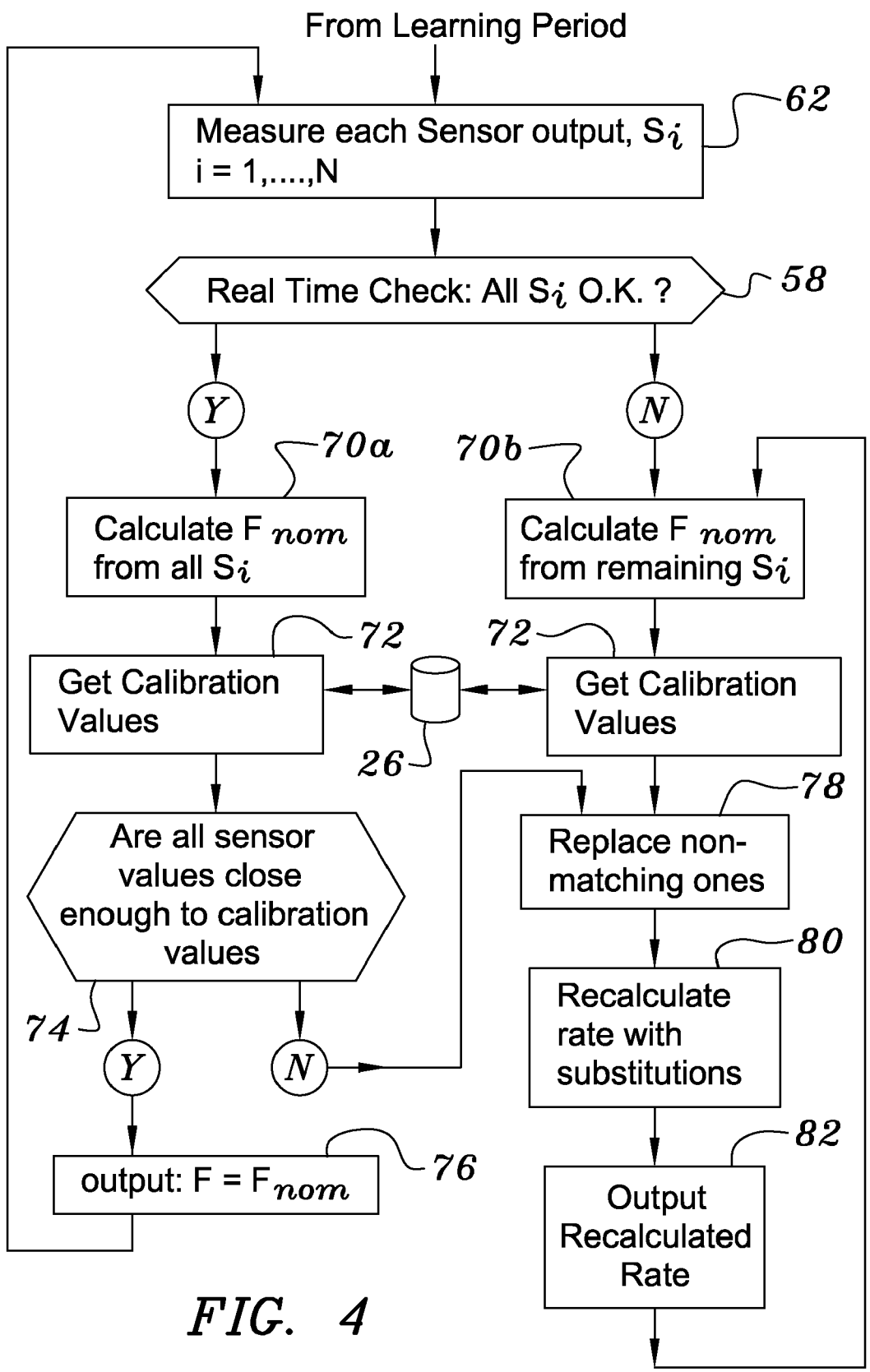
FIG. 4 is a flow diagram showing operation, in an operating period subsequent to the learning period, of a flow meter of the invention.

Turning now to FIG. 4, one finds a flow chart depicting an exemplar operational process in which a selected test algorithm is used to correct for local sensor failure. Outputs from all the local sensors are collected (Step 62), as was done during the learning period, and a nominal composite flow rate, $F_{nom}$, is calculated (Step 70) using the same algorithm as was used during the learning period. The value of $F_{nom}$ is then used to retrieve, from the non-volatile memory 26, a corresponding calibration record containing all the local sensor calibration values that are expected to go along with the newly calculated value (Step 72). Each of these calibration values is then matched (Step 74) against the currently measured value of the respective local sensor output by means of a selected matching algorithm. If all the calibration values match their respective current values, the composite flow output, F, is set equal to $F_{nom}$ (Step 76). This is the normal operating condition in which all of the local sensors are functioning according to their pre-established calibration. On the other hand, if the current signals, $S_i$, do not match, within tolerance, the expected values, $S_{i,cal}$ read from the calibration table, the current value of at least one of the locals sensors is replaced with the calibration value (Step 78) and the composite flow value is re-calculated using the substitute value (Step 80) and the recalculated value is output (Step 82).

For example, consider an installation having four local sensors, the outputs of which are averaged together to calculate a nominal composite flow rate. If one of those sensors fails completely so that it provides a zero signal value, the calculated average value would understate the actual composite flow by about 25%. On retrieving the calibration record associated with the inaccurate nominal flow value, one would find that three of the four current local signal values were 133% of the corresponding stored values and the fourth was 0% of the stored value. Thus, the matching algorithm could compare the disparities and decide that the one value that had a different disparity was the erroneous one. The measurement error could then be corrected in several ways. In a straightforward recursive approach one could replace the signal from the failed transducer with that from the calibration record that had been retrieved and repeat the steps of calculating and matching until a stable composite flow value was found. That is, in this case the initial replacement signal would be ⅓ below the value suggested by the signals from the three operative sensors so that an initial recalculation would still lead to an inaccurate estimate that would have to be corrected by further iterations. The reader will understand that many other corrective procedures are possible, and include recalculating the nominal current composite flow rate from only the trusted local sensors, retrieving the associated calibration record, and using it as the basis for substitution of the failed device.

The reader should recognize that many variations from this exemplar method are possible. For example, one can consider a case in which four flow sensors are used to measure an irregular flow profile having a substantial swirl component. One could find, in a situation of this sort that during a learning period one of the sensors had an output that was consistently ten percent or so above the average reading, another had an output consistently ten percent or so below the average, and the other two sensor outputs were more or less in line with the average reading. In a situation of this sort, during the subsequent operational period the test algorithm could look for unexpected changes in ratios of various local flow signals in addition to looking for mismatches with historical data from the calibration record. Moreover, during the learning period one could define a set of numerical relationships among the local flow sensors that was usable to calculate an expected local flow signal for any one of the sensors if the values for all the other sensors was known. Subsequently, during the operational period, instead of matching current and calibration record values of local flow sensors, one could determine if the set of numerical relations was currently satisfied and, if not, could replace the local flow signal output from the sensor having a currently unexpected value with the corresponding local flow signal output from the calibration record.

The method can also deal with situations in which one of the local sensors completely fails to respond to flow changes. For example, if a local sensor that is expected to provide an output voltage that varies with flow experiences a power failure, it can have a zero output value regardless of flow conditions. In cases where the local sensor is configured as a current sink (e.g., one configured according to a well-established 4-20 mA standard), a total failure can result in a current drain that exceeds the maximum. Thus, in general, if a local sensor signal is constrained to lie between an upper and a lower bounding value and the test algorithm finds that the signal is outside of that allowable range, then the data from the local sensor in question may be replaced with a value from the calibration table.

Although a portion of the foregoing discussion is presented, for purposes of clarity, as a simple table look-up process, the reader should appreciate that it is well known in the art of doing such look-ups to use an interpolation or extrapolation algorithm whenever a calculated value of F is not the same as a calibration value. For example, if F is within a measured range but is not identical to a calibration value, the process may take the closest tabular values above and below the value of F and interpolate between those two records to generate a respective expected value for each of the local sensors.

Moreover, although the above discussion is presented, for purposes of clarity, as using a simple matching step, it will be appreciated that exact matches are seldom expected and that some tolerance about a exact match is required. This may, of course, be stated in terms of determining an absolute difference between the two values and then finding if the difference exceeds a selected threshold. In a particular preferred embodiment, however, a ratio of the two signals is calculated and the substitution is made if the current local sensor signal differs by more than some selected percentage (e.g., 2%) from the calibration value.

The reader will further appreciate that although the depiction of FIG. 4 allows for the failure of several sensors and requires a recursive calculation of $F_{nom}$ until a value is found for which all the local sensor nom outputs are in agreement with their respective calibration values, many other sorts of logic flow arrangements can be contemplated. For example, in the twin-turbine example depicted in FIG. 1, there are only two local sensors at the beginning of the process, so that if one of them fails, the composite output is calculated from the current output of the functioning sensor and the calibration table value corresponding to the failed sensor, and the depicted recursive logic flow is not called for.

Because the process detects when the signal from one of the elements is being replaced by data from its calibration curve, this detection function can also serve to alert service personnel to the need for meter servicing. Moreover, multiple alerting and alarming levels can be arranged to be responsive to the number of failed local sensors. Moreover, although the exemplar flow chart shows a process in which each sensor is evaluated during each excursion through the main logic loop, this may not always be done. For example, if one of the sensors has failed completely and ceases to have an output the compensation algorithm can be configured to ignore further outputs from that sensor until the measurement system is repaired and some sort of reset indication is supplied.

A wide range of signal handling and processing configurations are possible within the scope of this invention. The signals from a local flow sensor may initially be processed to reduce sensing errors or noise prior to being stored in memory or used to provide an output signal.

Although the preceding discussion has been presented in terms of providing a permanently installed plurality of local sensors and then, during an operational period, compensating for failures of some fraction of the sensors, the same methodology can be employed to arrangements in which data from a plurality of temporarily installed local sensors is used to enhance the accuracy of measurement provided by at least one reference flow sensor. For example, one could install four dual turbine flow probes in a large pipe for the purpose of gathering flow profile data in a learning mode. This would yield a set of calibration records in which each record comprised a composite flow value and eight local sensor output values. After the learning period up to three of the probes could then be removed and the remaining reference sensor(s) could be used in a mode in which current signals are enhanced by using data from memory to simulate the behavior of the no-longer operating temporary local sensors. It may be noted that the same body of calibration data could be generated by permanently installing one reference local flow sensor and temporarily installing a single relocatable flow sensor at each of the locations where flow was to be sensed temporarily. In this arrangement a plurality of learning periods would be used to build up the complete calibration records by sequentially adding data for each of the local measurement positions.

Although the present invention has been described with respect to several embodiments, many modifications and alterations can be made without departing from the invention. Accordingly, it is that such modifications and alterations be considered as within the spirit and scope of the invention as described in the attached claims.

I claim:

1. A method of determining an overall rate of flow of a fluid by combining local flow signals from two or more local flow sensors, each of the local flow sensors trusted to provide an accurate respective local flow signal during a learning period, each of the local sensors subject to failure during an operational period subsequent to the learning period, the method comprising the steps of:

calculating, at each of a plurality of times during the learning period, a respective current composite flow value representative of the current overall rate of flow of the fluid by applying a flow-calculating algorithm to a set of all of the local flow signals and storing in a memory, for each of the composite flow values calculated during the learning period, a calibration record comprising at least the respective composite flow value and each of the local flow signals from which it was calculated to thereby build a calibration table;

determining, at any instant within the learning period, if the then current composite flow value is equal to an earlier composite flow value and, if so, combining each of the then current local flow signals with the corresponding local flow signal associated with the earlier composite flow value; and at each of a plurality of times during the operational period:

applying a test algorithm to each of the current local flow signals to determine if one of the local sensors has failed and if it has, modifying the set of all local flow signals by replacing the current local flow signal of the failed one of the sensors with a corresponding value from the calibration table and calculating the overall rate of flow by applying the flow-calculating algorithm to the modified set of local flow signals; and otherwise calculating the overall rate of flow by applying the flow-calculating algorithm to the set of current local flow signals.

2. The method of claim 1 wherein the test algorithm comprises the steps of:

a) calculating a nominal composite flow value by applying the flow-calculating algorithm to the current set of local flow signals;

b) retrieving from the memory the calibration record corresponding to the nominal composite flow value;

c) matching each of the current local flow signals with the corresponding value from the retrieved calibration record and determining that the failure has occurred only if the values do not match.

3. The method of claim 2 wherein the one of the current flow output signals matches the corresponding stored value if an absolute value of an arithmetic difference between the current and stored values is less than a selected allowable value.

4. The method of claim 2 wherein the one of the current flow output signals matches the corresponding stored value if a selected ratio of the current and stored values is both greater than a selected minimum value and less than a selected maximum value.

5. The method of claim 1 wherein each of the local sensor signals is constrained to lie between an upper and a lower bounding value and wherein the test algorithm comprises comparing each of the local flow signals with the respective bounding values and determining that the each of the local flow sensors has failed if its output does not lie between the respective upper and lower bounding values.

6. The method of claim 1 wherein the test algorithm comprises calculating at least one ratio of respective local flow output signals from two of the sensors, comparing the at least one ratio to an expected value thereof and determining that at least one of the sensors has failed if the calculated ratio does not match the expected value.

7. The method of claim 1 wherein the corresponding value from the calibration table is obtained by interpolating between two calibration records.

8. The method of claim 1 wherein the flow-calculating algorithm comprises one of a linear average and a weighted average.

9. The method of claim 1 wherein the storing step is executed at each of a plurality of selected instants within the learning period.

10. A method of determining an overall rate of flow of a fluid, the method comprising the steps of:
 a) installing at least one reference flow sensor operable to provide a local flow output signal from a selected reference location;
 b) providing at least one temporarily installable local flow sensor operable to provide a respective at least one temporary flow output signal associated with a respective at least one temporary measurement location;
 c) defining at least one learning period during which the at least one reference flow output signal is combined with each of the at least one temporary flow output signal according to a flow-calculating algorithm to calculate at least one composite flow value representative of a respective fluid flow rate within a range thereof;
 d) determining, at any instant within the learning period, if the then current composite flow value is equal to an earlier composite flow value and, if so, combining each of the then current temporary local flow output signals with the corresponding temporary local flow output signal associated with the earlier composite flow value;
 e) storing in a memory, for a plurality of composite flow values calculated during the at least one learning period, a corresponding plurality of calibration records, each of the calibration records uniquely associating a respective composite flow value with each of the reference and temporary local flow output signal values from which it was calculated;
 f) removing the temporary flow sensors after the at least one learning period is completed and, during a subsequent operational period:
  i) measuring at least one current reference flow value;
  ii) retrieving, from the memory, the calibration record associated with the current at least one reference flow value; and
  iii) calculating a current overall rate of flow by combining, according to the flow-calculating algorithm, the at least one reference flow output signal with the temporary local flow signal values from the calibration record.

11. The method of claim 10 wherein the flow-calculating algorithm comprises one of a linear average and a weighted average.

12. The method of claim 10 wherein the storing step is executed at each of a plurality of selected instants within the learning period.

\* \* \* \* \*